V. T. Hall.
Locking Device for Stop Cocks.
Nº 89,929. Patented May 11, 1869.
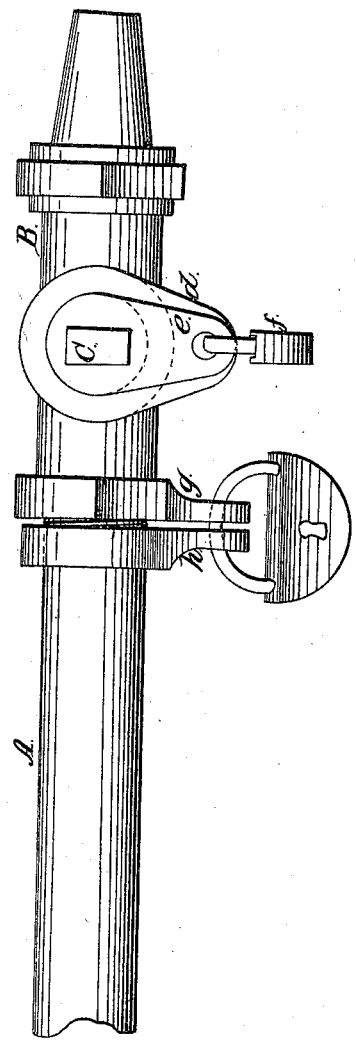
Witnesses
A. W. Almquist
Wm. A. Morgan
Inventor
V. T. Hall
per Munn & Co
Attorneys.

UNITED STATES PATENT OFFICE.

V. T. HALL, OF BROOKLYN, NEW YORK.

IMPROVED LOCKING DEVICE FOR STOP-COCKS.

Specification forming part of Letters Patent No. 89,929, dated May 11, 1869.

*To all whom it may concern:*

Be it known that I, VALENTINE T. HALL, of Brooklyn, in the county of Kings and State of New York, have invented a new and useful Improvement in Locking Device for Stop-Cocks; and I do hereby declare that the following is a full, clear, and exact description thereof, which will enable others skilled in the art to make and use the same, reference being had to the accompanying drawing, forming part of this specification.

This invention consists of a new and improved method of securing stop-cocks of gas, water, and steam-pipes, and stop-cocks used for all similar purposes from being opened, turned, or removed without the use of the proper key; and it consists in providing the cock and also the shell or pipe in which the cock turns with a projecting collar, lug, or ear, with holes through such collars or lugs, so arranged that when the cock is closed the holes shall register, so that a padlock may be applied thereto and the cock be prevented from turning, and the shell prevented from being turned from the pipe until the same is unlocked, as will be hereinafter more fully described.

The accompanying drawing represents a longitudinal view of a pipe with a stop-cock (shell and cock proper) attached and secured together, according to my invention.

A is the pipe. B is the shell, which is connected with the pipe A by screw-threads in the usual manner. C is the cock proper, which passes through the shell, the two forming what is known as a "stop-cock."

The object which I have in view is to prevent not only the cock C from being turned fraudulently, but to prevent the removal of the stop-cocks from the pipe for fraudulent purposes, whether the same be used for gas or steam, or for water or other liquids. For this purpose I provide the shell B with a projecting collar or lug, $d$, and the cock proper, C, with a projecting collar or lug, $e$, with a hole through each, which holes shall correspond in position when the cock is closed, as represented in the drawing, so that a padlock, $f$, may be inserted and the two be locked together, and thus secured, as seen in the drawing. For preventing the shell B from being removed from the pipe I have the same arrangement. $g$ is a collar or flange, elongated upon one side with a hole through it on the shell, and $h$ is a collar or flange elongated in a similar manner with a hole to correspond with that in $g$, so that a padlock may be applied to prevent it from being turned or removed.

Having thus described my invention, I claim as new and desire to secure by Letters Patent—

The collars, flanges, or lugs $d$ $e$ and $g$ $h$, formed upon the cock C, sleeve B, and pipe A to receive the padlocks, whereby either the cock is locked to the sleeve or the sleeve to the pipe A, all arranged as described, for the purpose specified.

V. T. HALL.

Witnesses:
FRANK BLOCKLEY,
ALEX. F. ROBERTS.